United States Patent [19]
Aitken et al.

[11] Patent Number: 4,738,807
[45] Date of Patent: Apr. 19, 1988

[54] LIQUID-VAPOR CONTACT APPARATUS

[75] Inventors: William H. Aitken, Epping; John F. Porter, High Ongar, both of England

[73] Assignee: The BOC Group plc, Windlesham, England

[21] Appl. No.: 945,443

[22] Filed: Dec. 22, 1986

[30] Foreign Application Priority Data

Dec. 23, 1985 [GB] United Kingdom ............... 8531685

[51] Int. Cl.$^4$ ............................................. B01F 3/04
[52] U.S. Cl. ................................................... 261/114.1
[58] Field of Search ..................................... 261/114.1

[56] References Cited

U.S. PATENT DOCUMENTS

| | | | |
|---|---|---|---|
| 243,297 | 6/1881 | Perin | 261/114.1 |
| 291,833 | 1/1884 | Bardo | 261/114.1 |
| 333,464 | 12/1885 | Horan | 261/114.1 |
| 2,217,386 | 10/1940 | Schulze | 261/114.1 |
| 2,720,389 | 10/1955 | Twomey et al. | 261/114.1 |
| 2,895,724 | 7/1959 | Newton et al. | 261/114.1 |
| 3,983,191 | 9/1976 | Schawls | 261/114.1 |

FOREIGN PATENT DOCUMENTS

| | | | |
|---|---|---|---|
| 1051805 | 3/1959 | Fed. Rep. of Germany | 261/114.1 |
| 998822 | 7/1965 | United Kingdom . | |
| 1478459 | 6/1977 | United Kingdom | 261/114.1 |

Primary Examiner—Tim Miles
Attorney, Agent, or Firm—R. Hain Swope; Larry R. Cassett

[57] ABSTRACT

A liquid-vapor contact apparatus for use in distilling air on board a ship has vertical outer walls disposed in the manner of the vertical faces of a cuboid. The apparatus includes a plurality of spaced, parallel, vertical plates. Between each pair of adjacent plates there is a plurality of spaced, generally horizontal, liquid-vapor contact members each including a horizontal tray member and having edges and in fluid-tight engagement with the respective plates. There are a plurality of downcomers for conducting liquid from tray member to tray member, there being separate flow paths for liquid between each pair of adjacent plates. The two outermost plates form one pair of walls of the apparatus. The other pair walls comprises alternate edge portions of plates and spacer bars (or members).

3 Claims, 2 Drawing Sheets

LIQUID-VAPOR CONTACT APPARATUS

BACKGROUND TO THE INVENTION

This invention relates to liquid-vapour contact apparatus suitable for use in fractionally distilling a liquid mixture comprising two or more components.

Conventional distillation columns for use in separating air employ circular or part-circular liquid-vapour contact trays. It has been found that aboard ship such columns perform badly as a result of the motion of the ship causing maldistribution of the liquid on the trays. Our UK patent specification No. 1 478 459 relates to a distillation column whose trays are each provided with spaced vertical baffles that limit displacement of the liquid across the tray in a direction normal to that of the liquid flow. The aforesaid UK patent specification describes an embodiment of such a column in which trays with generally rectangular liquid-bearing surfaces are employed. However, it has been found necessary to employ generally tubular column walls as difficulties arise in fabricating a vessel (for containing the trays) in the shape of a cuboid. Moreover, when a cylindrical vessel is employed it is found necessary to use separate reboilers and condensers. These requirements tend to add unnecessarily to the overall size of the apparatus thereby giving rise to further disadvantage since on board ship there is generally limited space available for an air separation column. The invention aims at providing a liquid-vapour contact apparatus that can for example be fabricated by vacuum brazing and that has vertical outer walls disposed in the manner of the vertical faces of a cuboid.

SUMMARY OF THE INVENTION

According to the present invention there is provided a liquid-vapour contact apparatus having vertical outer walls disposed in the manner of the vertical faces of a cuboid, said apparatus including a plurality of spaced, parallel, vertical plates, there being between each pair of adjacent plates a plurality of spaced, generally horizontal, liquid-vapour contact members each having one edge in engagement with one of said pair of plates and an opposite edge in engagement with the other of said pair of plates, and a plurality of downcomers for conducting liquid from tray to tray in downward vertical sequence, whereby there are separate flow paths for liquid between each pair of adjacent plates, and wherein the outermost plates provide one pair of opposed, vertical, outer walls of the apparatus, and the other pair of such walls each comprise alternate plate edges portions and vertical spacer members.

Preferably, each plate, save the said outermost ones, has a plurality of apertures formed therethrough for the passage of vapour, such apertures being disposed such that in operation of the column no liquid passes therethrough. The presence of such apertures helps to limit at any level in the apparatus differences in composition between the vapour between one pair of adjacent plates and the vapour between another pair of adjacent plates.

If desired, the liquid-vapour contact apparatus according to the invention may form part of a unitary apparatus additionally including a reboiler and a condenser.

The apparatus according to the invention is particularly suited for air separation use on board ship.

BRIEF DESCRIPTION OF THE DRAWINGS

Liquid-vapour contact apparatus according to the invention will now be described by way of example with reference to the accompanying drawings, in which.

DESCRIPTION OF PREFERRED EMBODIMENT

Figure 2:
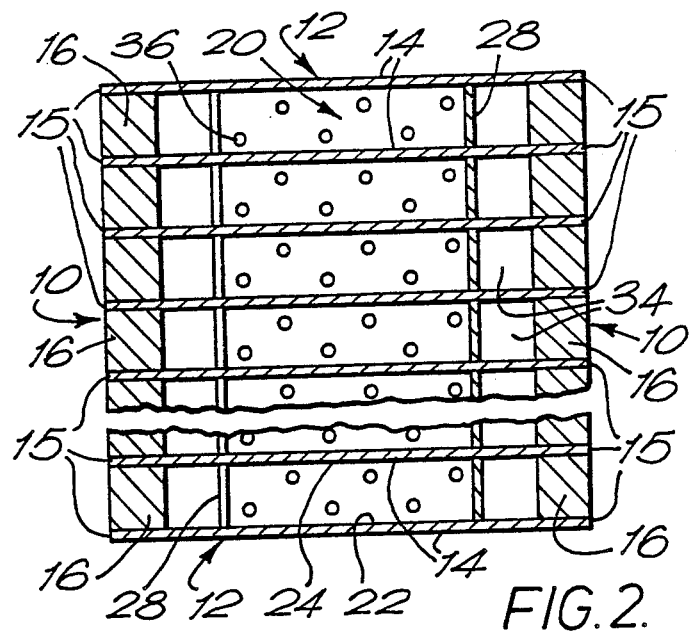
FIG. 2 is a section through the line II—II in FIG. 1.

Referring to the drawings, a distillation apparatus or column 2 formed as a unitary article has at its bottom, a reboiler 4 and at its top a condenser 6, and extending therebetween a liquid-vapour contact apparatus 8 in accordance with the invention. The distillation apparatus 2 is generally cuboidal in shape. The apparatus 8 has a first pair of opposed, vertical, outer walls 10 and a second pair of opposed, vertical, outer walls 12. As shown in FIG. 2, the apparatus 8 includes a plurality of vertical plates 14 that are spaced equally apart from one another and extend in parallel with one another. The two outermost ones of the plates 14 form the walls 12 of the apparatus 8. As shown in FIG. 2, the walls 10 are each formed by arrangement of edge portions 15 of the plates 14 and longitudinal spacing bars or members 16 extending from top to bottom of the apparatus 8.

Figure 3:
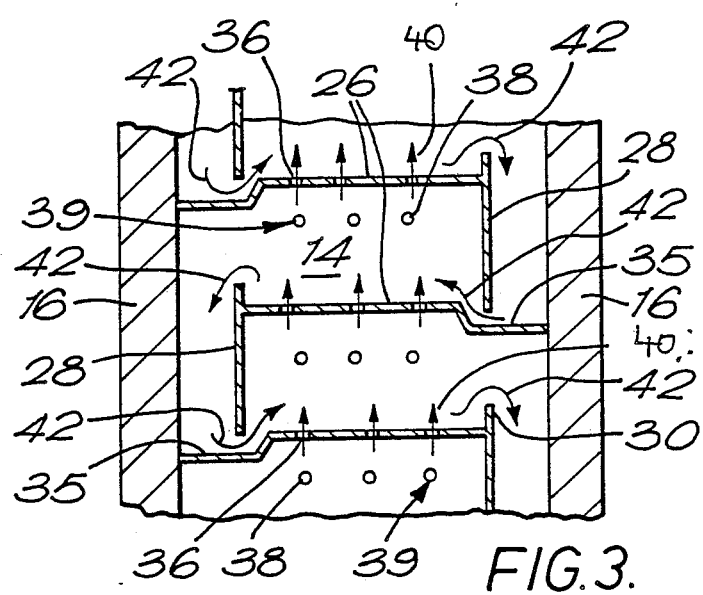
FIG. 3 is a section through the line III—III in FIG. 1.

The apparatus 8 additionally includes a plurality of liquid-vapour contact members 20, as shown in FIGS. 2 and 3. Between each pair of adjacent plates 14 there is a vertical array of such members 20. The members 20 each include a horizontal tray member 26 having a horizontal liquid bearing surface and perforations 36 formed therethrough. The peforations 36 are equally spaced from one another and have vertical axes. The members 20 have edges 22 and 24 in fluid-tight engagement with the plates 14 that they respectively abut. The liquid-vapour contact members 20 also include vertical partition members 28 which provide a weir 30 for each tray member 26 and a wall of a downcomer 34 for conducting liquid from said tray member to the tray member 26 immediately therebelow. Each downcomer 34 has a horizontal, liquid-collecting member 35 which is typically formed integral with the tray member 26 onto which said liquid is to be conducted by that downcomer in operation of the distillation apparatus 2.

With reference to FIG. 3, each plate 14 except the two that constitute the walls 12 has a multiplicity of orifices 38 formed therethrough. The orifices 38 may be arranged in rows 39, the distance between adjacent rows 39 being the same as the distance between adjacent tray members in each said array of such tray members. The position of each row 39 is such that in operation only vapour fully disengaged from liquid can pass therethrough. As shown in FIG. 3, therefore, the rows of 39 of orifices 38 are typically positioned just below the level of respective tray members 26.

Figure 1:
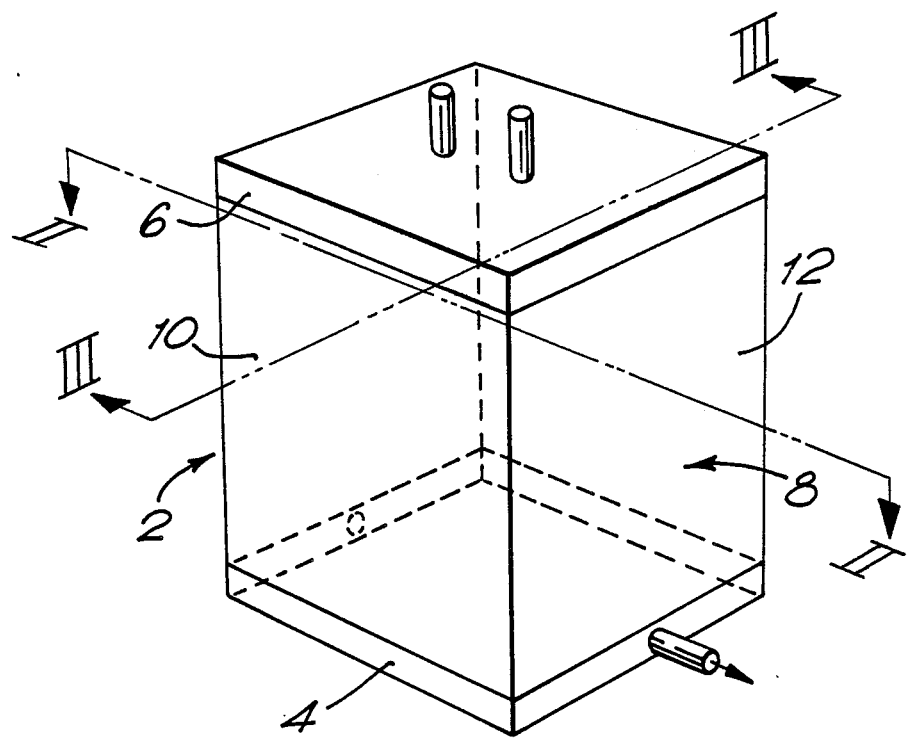
FIG. 1 is a schematic perspective view of a distillation plant including liquid-vapour contact apparatus according to the invention.

The liquid-vapour contact members 20 (including the members 26, 28 and 35) may comprise an integral pressing or may be fabricated from two or more pieces of metal. Typically, the apparatus 8 is formed of aluminium, although stainless steel and copper are acceptable alternatives. Where the members 20 are formed from more than one piece of metal, they may be prefabricated or alternatively joined together with other parts of the apparatus 8. Typically, in order to fabricate the apparatus 8, an assembly of all the plates 14, spacer members 16, and liquid-vapour contact members 20 is made as shown in FIGS. 1 to 3. All of the abutting surfaces may then be vacuum brazed together to form a unitary apparatus. Typically, the reboiler 4 and the condenser 6 may be brazed to the apparatus 8 at the same time. In general, the method of manufacture may resemble that employed to make matrix heat exchangers. It is to be appreciated that the perforations 36 and orfices 38 are made prior to the commencement of the vacuum brazing.

It is not essential that the various abutting surfaces be vacuum brazed togther in order to make fluid-tight joints therebetween. Other joining methods such as welding may be employed. However, vacuum brazing is generally preferred. Each pair of adjacent plates 14 defines therebetween a discrete and separate flow path for the liquid from that defined by the other pairs of adjacent plates 14.

In operation liquid from the condenser 6 flows onto each top tray member 26 at the top of a vertical array flows therealong and is conducted by a downcomer 34 to the next tray member 26 therebelow. In FIG. 3, the liquid flow path is illustrated by the arrows 42. As it passes along each tray member 26, liquid comes into intimate mass exchange relationship with vapour ascending the column from the reboiler 4 and passing through the perforations 36 in the tray members 26. Thus, the liquid as it descends the apparatus 8 tends to become richer in the less volatile component or components of the mixture being distilled, and the vapour as it ascends the column becomes richer in the more volatile component or components of the mixture being distilled. In FIG. 3, the upward passage of the vapour is indicated by the arrows 40. It is also to be appreciated that there will be some exchange of vapour across the plates 14 through the orifices 38. Such exchange of vapour helps to limit any disparity between the composition of vapour between one pair of adjacent pipes 14 and that of vapour at the same level between another pair of plates 14.

The apparatus shown in FIGS. 1 to 3 of the accompanying drawings is particularly intended for the distillation of air on board ship in order to produce either a nitrogen or an oxygen product, or both. The plates 14 help to limit displacement of the liquid on the tray members 26 in a direction generally at right angles to the direction of flow. Typically, on board a ship, the apparatus is mounted such that one wall 12 faces the stern and the other wall 12 faces the bow.

We claim:

1. A liquid-vapour contact apparatus having vertical outer walls disposed in the manner of the vertical faces of a cubold, said apparatus including a plurality of spaced, parallel, vertical plates, there being between each pair of adjacent plates a plurality of spaced, generally horizontal, perforated plate members comprising liquid-vapour contact trays each having one edge in engagement with one of said pair of plates and an opposite edge in engagement with the other of said pair of plates, and a plurality of vertical partition members between said vertical plates forming downcomers for conducting liquid from tray to tray in downward vertical sequence, whereby there are separate flow paths for liquid between each pair of adjacent plates, and wherein the outermost plates provide one pair of opposed, vertical, outer walls of the apparatus, and the other pair of such walls each comprise alternate vertical plate edge portions and vertical spacer members.

2. Apparatus as claimed in claim 1, wherein each of said vertical plates, save the outer most ones has a plurality of apertures formed therethrough for the passage of vapour, such apertures being disposed such that in operation of the apparatus no liquid passes therethrough.

3. Apparatus as claimed in claim 1, forming part of a unitary apparatus additionally including a reboiler and a condenser.

* * * * *